(12) United States Patent
Sanocki et al.

(10) Patent No.: US 9,174,159 B2
(45) Date of Patent: Nov. 3, 2015

(54) FRAMED PLEATED AIR FILTER WITH UPSTREAM BRIDGING FILAMENTS

(71) Applicant: 3M INNOVATIVE PROPERTIES COMPANY, St. Paul, MN (US)

(72) Inventors: Stephen M. Sanocki, Hudson, WI (US); Andrew R. Fox, Oakdale, MN (US); Jonathan M. Lise, Woodbury, MN (US); John J. Rogers, St. Paul, MN (US); Kannan Seshadri, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 90 days.

(21) Appl. No.: 13/968,626

(22) Filed: Aug. 16, 2013

(65) Prior Publication Data

US 2015/0047508 A1   Feb. 19, 2015

(51) Int. Cl.
*B01D 46/52* (2006.01)
*B01D 46/00* (2006.01)
*B01D 46/10* (2006.01)

(52) U.S. Cl.
CPC .......... *B01D 46/521* (2013.01); *B01D 46/0001* (2013.01); *B01D 46/0032* (2013.01); *B01D 46/10* (2013.01); *B01D 46/523* (2013.01)

(58) Field of Classification Search
CPC ............................ B01D 46/521; B01D 46/523
USPC .......................................................... 55/499
See application file for complete search history.

(56) References Cited

U.S. PATENT DOCUMENTS

| | | | |
|---|---|---|---|
| 3,404,748 A | 10/1968 | Bjorksten | |
| 3,733,226 A | 5/1973 | Stoller | |
| 3,893,879 A | 7/1975 | Ito | |
| 4,105,423 A | 8/1978 | Latakas | |
| RE30,782 E | 10/1981 | van Turnhout | |
| 4,813,948 A | 3/1989 | Insley | |
| 5,230,800 A | 7/1993 | Nelson | |
| 5,256,231 A | 10/1993 | Gorman | |
| 5,616,394 A | 4/1997 | Gorman | |
| 5,618,324 A | 4/1997 | Sommer | |
| 5,620,545 A | 4/1997 | Braun | |
| 5,681,302 A | 10/1997 | Melbye | |
| 5,814,219 A | 9/1998 | Friedmann | |
| 6,126,707 A * | 10/2000 | Pitzen | 55/495 |
| 6,280,824 B1 | 8/2001 | Insley | |
| 6,521,011 B1 | 2/2003 | Sundet | |

(Continued)

FOREIGN PATENT DOCUMENTS

WO   WO 2011-066224   6/2011

OTHER PUBLICATIONS

Lise, U.S. Appl. No. 13/490,545, filed Jun. 7, 2012 and entitled "Framed Air Filter with Offset Slot, and Method of Making."

(Continued)

*Primary Examiner* — Robert Clemente
(74) *Attorney, Agent, or Firm* — Kenneth B. Wood

(57) ABSTRACT

A framed pleated air filter, including a non-self-supporting, compressible, pleated air filter media with a plurality of oppositely-facing pleats and with a plurality of upstream pleat tips and downstream pleat tips, the pleated air filter media further including a plurality of bridging filaments that are bonded to at least some of the upstream pleat tips. The framed pleated air filter does not include any support member on the downstream face of the pleated air filter media.

17 Claims, 2 Drawing Sheets

(56) References Cited

U.S. PATENT DOCUMENTS

| | | | |
|---|---|---|---|
| 6,537,935 | B1 | 3/2003 | Seth |
| 6,623,587 | B1 | 9/2003 | Muller |
| 6,752,889 | B2 | 6/2004 | Insley |
| 6,980,804 | B2 | 12/2005 | Maki |
| 7,052,565 | B2 | 5/2006 | Seth |
| 7,235,115 | B2 | 6/2007 | Duffy |
| 7,390,760 | B1 | 6/2008 | Chen |
| 7,537,632 | B2 | 5/2009 | Miller |
| 7,691,760 | B2 | 4/2010 | Bergsten |
| 7,713,324 | B2 | 5/2010 | Linhart |
| 7,896,940 | B2 | 3/2011 | Sundet |
| 8,162,153 | B2 | 4/2012 | Fox |
| 8,231,700 | B2 | 7/2012 | Sundet |
| 8,240,484 | B2 | 8/2012 | Fox |
| 2002/0083837 | A1 | 7/2002 | Doherty |
| 2002/0137418 | A1 | 9/2002 | Seth |
| 2003/0089091 | A1 | 5/2003 | Sundet |
| 2003/0230061 | A1* | 12/2003 | Kubokawa et al. ............ 55/486 |
| 2004/0011204 | A1 | 1/2004 | Both |
| 2004/0172930 | A1 | 9/2004 | Nguyen |
| 2005/0204714 | A1 | 9/2005 | Sundet |
| 2006/0005517 | A1 | 1/2006 | Sundet |
| 2006/0005518 | A1 | 1/2006 | Duffy |
| 2007/0084786 | A1 | 4/2007 | Smithies |
| 2007/0204573 | A1* | 9/2007 | Justice ............ 55/495 |
| 2008/0035272 | A1 | 2/2008 | Mills |
| 2008/0038976 | A1 | 2/2008 | Berrigan |
| 2008/0067121 | A1 | 3/2008 | Ter Horst |
| 2009/0047855 | A1 | 2/2009 | Seth |
| 2010/0326028 | A1* | 12/2010 | Sundet ............ 55/499 |
| 2011/0084017 | A1 | 4/2011 | Pocher |
| 2011/0138760 | A1 | 6/2011 | Sundet |
| 2012/0317944 | A1 | 12/2012 | Lise |
| 2013/0101477 | A1 | 4/2013 | Both |
| 2013/0139691 | A1 | 6/2013 | Goldbach |
| 2013/0327004 | A1* | 12/2013 | Lise et al. ............ 55/493 |

OTHER PUBLICATIONS

Fox, U.S. Appl. No. 13/968,609, filed Aug. 16, 2013 and entitled "Nestable Framed Pleated Air Filter and Method of Making."

* cited by examiner

FRAMED PLEATED AIR FILTER WITH UPSTREAM BRIDGING FILAMENTS

BACKGROUND

Framed, pleated filters are commonly used in air filtration applications. In such filters, support is often provided with support on the downstream side of the pleated filter media.

SUMMARY

Herein is disclosed a framed pleated air filter, including a non-self-supporting, compressible, pleated air filter media with a plurality of oppositely-facing pleats and with a plurality of upstream pleat tips and downstream pleat tips, the pleated air filter media further including a plurality of bridging filaments that are bonded to at least some of the upstream pleat tips. The framed pleated air filter does not comprise any support member on the downstream face of the pleated air filter media. These and other aspects of the invention will be apparent from the detailed description below. In no event, however, should this broad summary be construed to limit the claimable subject matter, whether such subject matter is presented in claims in the application as initially filed or in claims that are amended or otherwise presented in prosecution.

BRIEF DESCRIPTION OF THE DRAWINGS

FIG. 1 is a perspective view of an exemplary framed pleated air filter viewed from the downstream side.

FIG. 2 is a perspective view of an exemplary pleated air filter with the support frame omitted, viewed from the upstream side.

Like reference symbols in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

DEFINITIONS

Figures 1, 2:
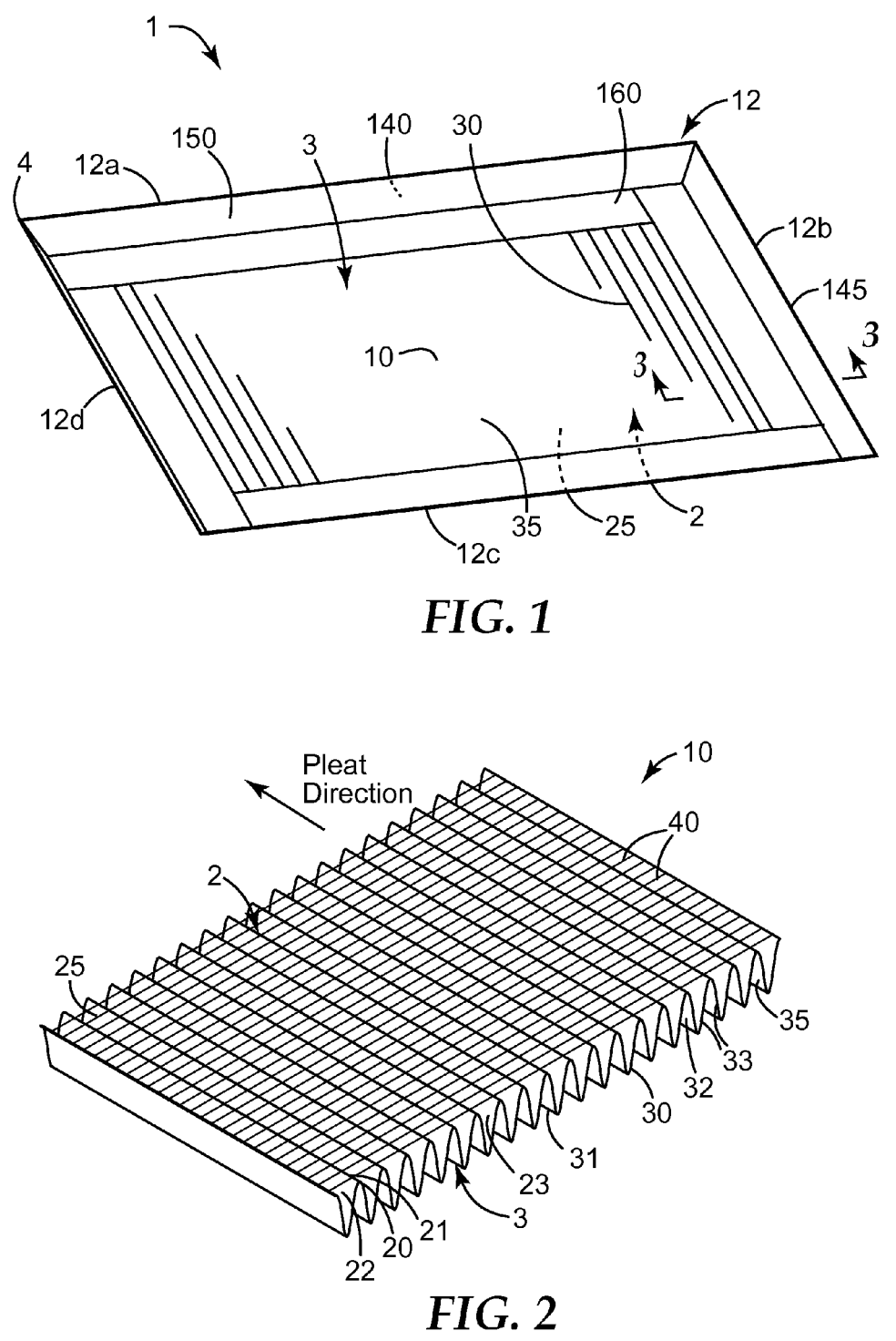
Figure 3:
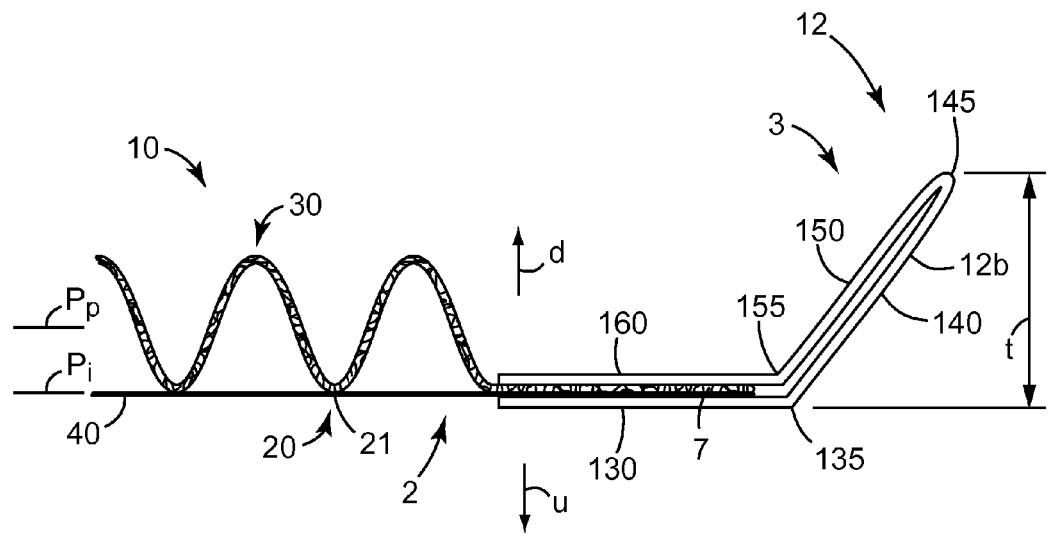
FIG. 3 is a side schematic cross sectional view of a portion of the framed pleated air filter of FIG. 1, taken along line 3-3 of FIG. 1.

Although terms such as "top", "bottom", "upper", "lower", "under", "over", "front", "back", "up" and "down", and "first" and "second" may be used in this disclosure, it should be understood that those terms are used in their relative sense only unless otherwise noted. As used herein as a modifier to a property, attribute or relationship, the term "generally", unless otherwise specifically defined, means that the property, attribute or relationship would be readily recognizable by a person of ordinary skill but without requiring absolute precision or a perfect match (e.g., within +/−20% for quantifiable properties); the term "substantially" means to a high degree of approximation (e.g., within +/−10% for quantifiable properties) but again without requiring absolute precision or a perfect match. Terms such as "outer", "outward", "outwardmost", "outwardly", and the like, mean in a direction generally away from the geometric center of the framed air filter. Terms such as "inner", "inward", "inwardmost", "inwardly", and the like, mean in a direction generally toward the geometric center of the framed air filter media. The term "upstream" is used to denote the side of an air filter from which moving air (in an HVAC system) impinges on the filter media. The upstream side corresponds to the lower side of framed filter 1 as shown in FIG. 1 and to the upper side of pleated filter media 10 as shown in FIG. 2. The term "downstream" is used to denote the side of an air filter through which air exits the filter media, corresponding to the upper side of framed filter 1 as shown in FIG. 1 and to the lower side of pleated filter media 1 as shown in FIG. 2. (FIG. 3 is marked with "u" and "d" axes to aid in recognition of upstream and downstream sides of the framed filter and components thereof.)

The term "non-self-supporting" denotes a pleated air filter media that is not capable, in the absence of a support frame that is mounted to the major edges of the pleated filter media to form a framed air filter, of withstanding the forces encountered due to forced-air flow in a typical residential HVAC system, as discussed in detail later herein. Such non-self-supporting pleated air filter media by definition does not encompass pleated air filter media (such as those described e.g. in U.S. Pat. Nos. 8,231,700, 7,896,940 and 6,521,011, all to Sundet, and U.S. Patent Application Publication 2013/0101477 to Both) for which the use of a frame is described as optional.

The term "nestable" denotes framed filters that are configured so that two or more such filters (of like shape, size, and thickness) can be stacked together, without significantly deforming the frames of the filters, at a nesting spacing that is less than 85% of the thickness of each filter, as discussed in detail herein.

The term "compressible" with reference to a pleated filter medium denotes that the pleats of the filter medium can reversibly compress when moderate force is applied to the pleats (e.g., when the framed air filter is nested with other framed air filters of like size and shape), and that the pleats can spring back to their original pleated configuration when the force is removed (e.g., when the filter is removed from a nested condition).

DETAILED DESCRIPTION

Shown in FIG. 1 in perspective view from the downstream side is an exemplary framed air filter 1. Shown in FIG. 3 is a cross-sectional slice view of a portion of the exemplary air filter of FIG. 1, taken along line 3-3 of FIG. 1. Framed air filter 1 comprises an upstream side 2 and a downstream side 3. Air filter 1 comprises pleated filter media 10 and support frame 12 mounted generally on, and surrounding, the perimeter of pleated filter media 10. Framed air filter 1 may often be rectangular in shape (which specifically includes square shapes) with corners 4, with pleated filter media 10 thus having a generally rectangular perimeter (which does not preclude irregularities, notches, chamfered or angled corners, or the like, in the perimeter of filter media 10). Framed filters of this type are distinguished from e.g. cylindrical (cartridge) filters.

In FIG. 1, framed air filter 1 is viewed from the downstream side. (Such filters are often marked by the manufacturer to identify the upstream and downstream sides, in order that the filter be installed in the proper orientation in an HVAC system.) In framed air filters of this general type (i.e., with "pinch" frames as described in further detail herein), the downstream side of a framed air filter may be an "open-ended" side comprising outwardly flared edges of frame 12, as seen e.g. in FIG. 1 and in further detail in FIG. 3. That is, such filters are often placed into forced air ventilation systems with the closed-end side of the filter facing the stream of incoming air (i.e., facing upstream) and with the open-ended side of the filter facing downstream (e.g. with the terminal ends 145 of at least some of the frame sidewalls resting against support flanges of the forced air ventilation system).

Pleated filter media 10 comprises an upstream face 25 and a downstream face 35. As shown in further detail in FIG. 2, which shows an exemplary pleated filter media 10 with frame 12 omitted, pleated filter media 10 comprises a plurality of upstream pleats 20, oriented in generally parallel relation to each other. Each upstream pleat 20 comprises an upstream pleat tip 21 and each adjacent pair of upstream pleats 20 defines an upstream pleat valley 22 therebetween. Flowing air may pass into upstream valley 22 and into upstream pleat walls 23 so as to penetrate into pleated filter media 10. Pleated filter media 10 further comprises a plurality of downstream pleats 30, in generally parallel relation to each other and in oppositely-facing configuration from upstream pleats 20. Each downstream pleat 30 comprises a downstream pleat tip 31 and each adjacent pair of downstream pleats 30 defines a downstream pleat valley 32 therebetween. Flowing air may pass out of downstream pleat walls 33 so as to exit pleated filter media 10.

Bridging Filaments

Framed air filter 1 comprises a plurality of bridging filaments 40 on upstream face 25 of pleated filter media 10. At least portions of at least some of the bridging filaments 40 are bonded to at least portions of at least some of the upstream pleat tips 21 of pleated filter media 10 and can help locally stabilize pleated filter media 10 as disclosed herein.

By definition, a bridging filament is not pleated along with pleated filter media 10. Also by definition, a bridging filament is one that extends between, and is bonded to, at least two upstream pleat tips 21 of pleated filter media 10; or, that is bonded to and/or entangled with other filaments so that the filaments collectively bridge the distance between at least two upstream pleat tips 21 of pleated filter media 10 (with at least some of the filament portions that are in contact with the upstream pleat tips being bonded to the pleat tips). That is, in some exemplary embodiments bridging filaments might be collectively supplied by e.g. filaments of a spun-bonded web (scrim), which filaments, even if they are too short and/or are oriented so that they do not extend between upstream pleat tips, are bonded to other filaments so as to collectively bridge the distance between the upstream pleat tips (with the filament portions that are in contact with the upstream pleat tips being bonded thereto). In other exemplary embodiments bridging filaments might be collectively supplied by e.g. filaments of an expanded metal (such as e.g. the products available from Wallner Tooling/Expac, Rancho Cucamonga, Calif.), even though individual segments of the metal filaments (between junction points with other individual segments) may (or may not) be long enough to extend between two upstream pleat tips.

In at least some embodiments, however, bridging filaments 40 will comprise an average length that is at least 100%, 200%, 400%, or 800% of the spacing between consecutive upstream pleat tips 21, and/or will be arranged so that at least some individual filaments extend between, and are bonded to, at least two upstream pleat tips 21 of pleated filter media 10.

Not being pleated, bridging filaments 40 will often comprise a generally planar configuration (as shown in exemplary embodiment in FIG. 2). This may be characterized herein as filaments 40 collectively forming a stabilizing plane, noting that the term is used for convenience and that the filaments do not have to form a perfectly flat plane (e.g., some slight sagging of portions of filaments 40 into upstream pleat valleys 22 may occur). Regardless of how closely the filaments approach a true plane, most portions of most filaments 40 are spaced away from the majority of the area of upstream pleat walls 23; that is, they are spaced apart from all such pleat wall areas except those at, or very close to, upstream pleat tips 21. Bridging filaments 40 are thus by definition in discontinuous contact with the upstream face 25 of pleated filter media 10.

Bridging filaments may be provided on the upstream face of pleated filter media 10 in any suitable manner and in any suitable arrangement. An exemplary arrangement of a plurality of bridging filaments 40 is shown in FIG. 2, which is a view from the upstream side of pleated filter media 10 (that is, with pleated filter media 10 inverted from the configuration shown in FIG. 1). In embodiments of the general type shown in FIG. 2, at least some bridging filaments 40 may be oriented at least generally perpendicular to (e.g., within +/− about 5 degrees of 90 degrees to) the pleat direction of pleated filter media 10 (with pleat direction meaning a direction parallel to pleat tips 21 and 31, as signified by the arrow in FIG. 2). In such cases, a bridging filament may extend between, and be bonded to, e.g. three, four, eight, or more upstream pleat tips 21. In some embodiments, at least some bridging filaments may be continuous, meaning that they extend along the entire length of pleated filter media 10 (as in the exemplary design of FIG. 2). Such continuous bridging filaments thus will not be severed or otherwise made discontinuous anywhere along the entire length of pleated filter media 10. In any case, a bridging filament 40 (continuous or not) will be distinguished from filaments that are cut or otherwise made so short that they do not extend between at least two upstream pleat tips (and are not bonded to other filaments in such manner to collectively form bridging filaments, as discussed above). In some embodiments bridging filaments 40 are at least generally straight, as shown in exemplary embodiment in FIG. 2. In embodiments of this type, at least some of the bridging filaments 40 may be at least generally parallel to each other, again as shown in exemplary illustration in FIG. 2. However, other arrangements are possible, as discussed later herein.

Bridging filaments 40 can advantageously locally stabilize pleated filter media 10 to minimize any local deformation of a pleat due to the pressure of an airstream impinging on upstream face 25 of pleated filter media 10. Specifically, filaments 40 as provided on the upstream face 25 of pleated filter media 10 can the minimize local deformation of at least upstream pleats 20, in a way that may not be possible were filaments 40 to be provided only on the downstream face 35 of pleated filter media 10. If filaments 40 (or, in general, any other type of support) were to be provided on the downstream face of pleated filter media 10, the pressure of the impinging air could cause upstream pleats 20 to locally deform, e.g. collapse, toward the downstream side of the pleated filter media, a process that filaments 40 could do little or nothing to prevent. In contrast, with filaments 40 placed on the upstream face of the pleated filter media and bonded to the upstream pleat tips, the filaments may largely prevent the upstream pleats from locally collapsing or deforming toward the downstream side of the pleated filter media under the air pressure. Moreover, since the pressure of the moving air will tend to "inflate" the downstream pleats, the filaments, being bonded to the upstream pleat tips, may also locally stabilize the downstream pleats, e.g. by limiting the inflation of the downstream pleats so as to e.g. prevent any unacceptable billowing or ballooning of the downstream pleats. It will thus be appreciated that bridging filaments 40 can act to locally stabilize pleated filter media 10, without causing pleated media 10 to be self-supporting (and without compromising the ability of framed air filters 1 to be optionally nested if this is desired).

Any suitable filaments 40 may be used, made of any suitable materials. In some embodiments, filaments 40 may be non-elastic. Non-elastic as defined herein encompasses any material that does not have the relatively high reversible extensibility (characterized e.g. by the ability to be reversibly elongated to e.g. 100% or more without undergoing plastic deformation) characteristic of elastic materials such as natural rubber, SBR rubber, lycra, etc. Thus, common polymeric materials, e.g. extrudable materials (including but not limited to e.g. polypropylene, poly(lactic acid), polyethylene terephthalate and the like), may be used to form filaments 40. In other embodiments, filaments 40 may be made of an elastic material. Regardless of the specific composition of filaments 40, it may be desired that in at least some embodiments, filaments 40 may not extend or elongate to any significant extent (e.g., more than about 10%) under the forces present upon the exposure of framed air filter 1 to a typical residential HVAC airstream. In some embodiments, filaments 40 as disclosed herein are flexible, meaning that filaments 40 can (individually and collectively) be easily and reversibly bent, curved, rolled up etc. In specific embodiments, bridging filaments 40 are not comprised of a shape-memory polymer.

In various embodiments, filaments 40 may comprise an average diameter (or equivalent diameter in the case of filaments with a non-circular or irregular cross-section) of at most about 2, 1, 0.5, 0.2, or 0.1 mm. In further embodiments, filaments 40 may comprise an average diameter or equivalent diameter of at least about 0.05, 0.10, or 0.20 mm. Filaments 40 may comprise any suitable shape when viewed in cross section, (e.g., generally round, square, oblong, etc.). Filaments 40 can comprise suitable spacings between individual filaments as desired (e.g., when filaments 40 are arranged e.g. in parallel to each other so that such an average spacing can be measured). In various embodiments, the filament spacing can be at least about 2 mm, at least about 4 mm, or at least about 6 mm. In additional embodiments, the filament spacing can be at most about 20 mm, at most about 15 mm, at most about 10 mm, or at most about 8 mm. The filament spacings can be relatively constant or can be varied. Some inherent variation in filament spacing may occur in production and handling of filaments, of course. Regardless of the specific arrangements, a suitable set of filaments 40 will collectively comprise a highly open structure (in various embodiments, comprising greater than at least 80, 90, or 95% open area) so as to allow sufficient airflow into pleated filter media 10.

Filaments 40 may be made of any material, provided in any form and in any manner, as long as the material, in combination with the dimensions (e.g., width, thickness) of the filaments, provides the desired combination of physical properties (e.g., flexibility and inextensibility). Such materials may include organic polymeric materials (whether naturally occurring or synthetic, including those already mentioned above), inorganic materials (e.g., fiberglass), metals (such as metal meshes, e.g. expanded metals) and so on. In some embodiments, filaments 40 are not made of metal or of inorganic materials such as fiberglass.

As discussed above, in some embodiments, filaments 40 may be individual filaments that are individually provided (e.g., polymeric filaments that are extruded onto the upstream pleat tips 21 of pleated filter media 10 as described later herein). In other embodiments, filaments 40 may be provided as filaments of a scrim. In this context, the term scrim is used to broadly encompass any collection of filaments that are in contact with each other, achieved by any method of manufacture. Specifically, the term scrim is not limited to organic polymeric materials but rather includes metal meshes or netting (e.g. expanded metals as mentioned earlier herein), inorganic scrims made of e.g. fiberglass, and so on. In some embodiments, such a scrim may be a pre-existing scrim, meaning a scrim that has been pre-made and that has sufficient mechanical integrity to be handled, and brought into contact with the upstream pleat tips, as a unit.

In some embodiments, such a scrim (whether pre-existing or not) may comprise at least some bridging filaments 40 that are oriented generally perpendicular to the pleat direction and that are parallel to each other (e.g., that are oriented in similar manner to the filaments 40 of FIG. 2), with other filaments also present (that may or may not be bridging filaments) and which other filaments may be oriented in various directions. In some embodiments of this general type a collection of bridging filaments 40 may be provided in the form of plastic mesh or netting, a knit or woven fabric, and so on (noting however that any such material does not necessarily have to be bonded to the pleated filter media so that a set of filaments of the material is strictly, or even generally, perpendicular to the pleat direction.)

In some embodiments, rather than filaments being present that are oriented at least generally perpendicular to the pleat direction, filaments may be present at a wide variety of orientations (and spacings). Such filaments may follow curves, loops, tortuous paths, and so on, as long as a sufficient number of filaments bridge the gaps between upstream pleat tips 21 to serve as bridging filaments. That is, filaments 40 may be provided as part of a scrim that comprises a collection of randomly-oriented filaments, as long as such filaments are sufficiently long and are bonded and/or entangled with each other to serve as bridging filaments as defined herein. Such a scrim might be e.g. a spun-bonded web, spun-laced web, a carded web, a Rando web, a laminate of multiple webs, and so on.

It is thus emphasized that bridging filaments 40 may be provided in a wide variety of ways. However, in some particular embodiments as discussed above, bridging filaments 40 are provided only in the form of filaments that are oriented at least generally parallel to each other and that are not connected with each other by any other filaments. Such embodiments preclude the use of filaments that are part of e.g. a pre-existing scrim that includes filaments oriented in a wide variety of directions; e.g. scrims with multi-directional fibers such as tri-directional scrims and the like. Regardless of the specific nature of the bridging filaments on the upstream face of the pleated filter media, no bridging filaments of any kind will be present on the downstream face of the pleated filter media. In fact, no support member of any kind will be present on the downstream face of the pleated filter media, as discussed in detail later herein.

Filter Media

Pleated filter media 10 may be any suitable media that is pleatable and that is capable of air filtration. Potentially suitable materials may include e.g. paper; porous films of thermoplastic or thermoset materials; nonwoven, such as melt blown or spunbond, webs of synthetic or natural fibers; scrims; woven or knitted materials; foams; electret or electrostatically charged materials; fiberglass media; or laminates or composites of two or more materials. A nonwoven polymeric web comprised of polyethylene, polypropylene or poly (lactic acid) may be suitable, for example. Any suitable method of making a nonwoven web (e.g., melt-blowing, melt-spinning, carding, and so on) may be used. Filter media 10 may also include sorbents, catalysts, and/or activated carbon (granules, fibers, fabric, and molded shapes).

Laminated media can also be used as filter media 10. Such media may consist of laminated layers of the media discussed above or of other substrates laminated to one or more layers of filter media, for example. In some embodiments, a prefilter layer may be used on the upstream side of filter media 10. Such a prefilter layer may comprise e.g. polypropylene, polyethylene, polyethylene terephthalate, poly(lactic acid), or blends of these materials. In other words, in some embodiments pleated filter media 10 may comprise a base (e.g., filtration) layer, along with any other layer or layers as desired for any purpose, as long as it allows pleated media 10 to remain non-self-supporting as defined and described herein. For example, a highly open plastic netting or mesh might be laminated to the pleated media, in order to e.g. enhance the abrasion resistance of the media. Any such layer may be bonded to e.g. a base (e.g. filtration) layer by any suitable method, e.g. by melt-bonding, by way of an adhesive (hot melt adhesive, pressure-sensitive adhesive, and so on).

In specific embodiments, electret filter webs can be formed of split fibrillated charged fibers e.g. as described in U.S. Pat. No. RE 30,782. Such charged fibers can be formed into a nonwoven web by conventional means and optionally joined to a scrim such as disclosed in U.S. Pat. No. 5,230,800 forming an outer support layer. In other specific embodiments, filter media 10 can be a melt blown microfiber nonwoven web, e.g. such as disclosed in U.S. Pat. No. 4,813,948, which can optionally be joined to a secondary layer during web formation as disclosed in that patent, or subsequently joined to a secondary web in any conventional manner.

Filtration media that may be particularly suitable for certain applications might include e.g. media of the general type described in U.S. Pat. No. 8,162,153 to Fox; media of the general type described in U.S. Patent Application Publication 2008/0038976 to Berrigan; and, media of the general type described in U.S. Patent Application Publication 2004/0011204 to Both.

Pleated filter media 10 may comprise any suitable pleat frequency. In various embodiments the pleat frequency may be at most about 1.6, 1.2, 1.0, or 0.8 pleats per cm; in further embodiments the pleat frequency may be at least about 0.3, 0.4, or 0.5 pleats per cm. (In this context the pleat frequency means the number of times that a reference point, e.g. an upstream pleat tip, repeats per cm of distance). In various embodiments, the pleat height (pleat amplitude) of media 10 (defined as the distance in an upstream-downstream direction (i.e., a direction orthogonal to the overall major plane of filter 1/filter media 10), from the upstream surface of an upstream pleat tip to the downstream surface of a downstream pleat tip), can be at least about 2, 4, 6 or 8 mm. In further embodiments, the pleat height may be at most about 12, 6, 4, 2, or 1 cm. In some embodiments the pleats of pleated media 10 may be sinusoidal, meaning that the tips of such pleats have an average radius of curvature of at least about 2 mm. In various embodiments, such sinusoidal pleats may comprise tips with an average radius of curvature of at least about 3, 4, 5, or 6 mm. Sinusoidal pleats as disclosed herein (and as shown in exemplary embodiment in FIGS. 3 and 4) are distinguished from e.g. "zig-zag" style pleats that comprise extremely flat walls that meet at pleat tips with extremely small radii of curvature. (Such zig-zag style pleats are often used in e.g. self-supporting filter media and are often achieved e.g. by scoring the filter media to provide a score line, along which the media is then folded to form a very sharp pleat.)

Non-Self-Supporting Pleated Filter Media

As discussed earlier herein, pleated filter media 10 is non-self-supporting, even in the presence of bridging filaments 40 on the upstream face thereof. That is, even though bridging filaments 40 may help to stabilize the pleats of pleated filter media 10 against local deformation as disclosed earlier herein, the presence of bridging filaments 40 is not sufficient to render pleated filter media 10 self-supporting. By non-self-supporting is meant a pleated air filter media that is not capable, in the absence of a support frame that is mounted to the major edges of the pleated filter media to form a framed air filter, of withstanding the forces encountered due to forced-air flow in a typical residential HVAC system. Specifically, non-self-supporting denotes a pleated air filter media that, when placed in a conventional holding fixture of a residential HVAC system without a supporting edge frame, is unable to withstand the forces developed when air impinges the upstream face of the air filter media so as to develop a pressure of at least 0.10 kPA (0.4 inch of water). (By unable to withstand such forces means that the pleated air filter media collapses, deforms, becomes dislodged, ruptures, or the like, so as to render the performance of the air filter media unsatisfactory.)

Methods of Making

Filter media 10 can be pleated by any suitable method by which pleats may be formed in a media prior to bridging filaments 40 being bonded to upstream pleat tips thereof (noting that the term pleated filter media as used herein does not encompass filter media that is formed into a folded or puckered shape by way of the e.g. shrinking of a shape-memory polymer that is attached to portions thereof). Particularly advantageous methods might include the processing of the media through a set of corrugating gears, e.g. in any suitable variation of the methods disclosed in e.g. U.S. Pat. No. 5,256,231. Bridging filaments 40 may be bonded to upstream pleat tips of a pleated filter media 10 by any suitable method. If the filaments are provided as a pre-existing scrim, such a scrim can be applied to the upstream face of pleated filter media 10, and bonded to at least some of the upstream pleat tips thereof, by any suitable method. For example, a scrim may be obtained e.g. as a continuous roll, a bonding adhesive can be applied thereto (e.g., by coating the adhesive onto at least some surfaces of filaments of the scrim), and the scrim then contacted with the pleated media so as to cause bonding between adhesive-coated portions of the filament and portions of the upstream pleat tips that they are contacted with.

Other bonding methods (e.g., ultrasonic bonding, melt-bonding (including e.g. heat-sealing), and so on), are also possible. In embodiments in which filaments 40 are not provided as part of a pre-existing scrim, they may be conveniently melt-extruded onto the upstream pleat tips of a pleated filter media, e.g. while the media is still resident on a corrugating (pleating) gear or any other kind of corrugating apparatus. Such methods could be any suitable variation of the methods disclosed in e.g. U.S. Pat. Nos. 5,256,231; 5,620,545; and 7,052,565, all of which are incorporated by reference herein in their entirety. In embodiments in which filaments 40 are melt-bonded to the upstream pleat tips of media 10, the composition of filaments 40 and the fibers of media 10 (specifically, the outermost fibers of media 10, if media 10 comprises multiple layers) may be advantageously chosen to facilitate such melt-bonding. For example, the filaments and fibers may be made of materials that are sufficiently compatible to allow melt-bonding to occur. In specific embodiments, filaments 40 and the fibers of media 10 may be comprised of the same type of polymer (e.g., they may both be polypropylene; they may both be poly(lactic acid), etc.). It will be noted that in some circumstances (e.g., when the filaments 40 are melt-extruded onto the pleat tips) some penetration of the molten filament material into the spaces between the fibers of media 10 may occur, which may augment the bonding process by achieving at least some physical entanglement or entrapment.

However provided, in at least some embodiments filaments 40 may be provided (in a spaced-apart manner) generally across the entire width (that is, the dimension that is generally orthogonal to the pleat direction and to the upstream-downstream axis of the filter media) of the pleated filter media. Pleated filter media 10 may be trimmed or cut to the desired final width before or after the bonding of the filaments thereto, as desired.

The pleat direction of filter media 10 relative to frame 12 (and thus to the finished filter 1) and the orientation (i.e., of the long axes) of filaments 40 relative to frame 12, may each be chosen as desired. In some embodiments in which filter 1 is non-square, the pleat direction may oriented generally perpendicular to the long axis of filter 1 (as in the design of FIG. 1); and, filaments 40 may be oriented generally in alignment with the long axis of filter 1 (as in the design of FIG. 2, although the frame is omitted from the Figure). In some embodiments the terminal ends of filaments 40 may generally coincide with terminal edges of pleated filter media 10, as shown in FIG. 2 (however, the filaments 40 do not necessarily have to be straight and/or parallel, as discussed above). In other embodiments, the terminal ends of at least some filaments 40 may extend beyond a terminal edge of pleated media 10 (although such ends might end up folded back onto a border portion of pleated media 10 when a frame is applied to the edges of the pleated media).

Frame

A frame (i.e., a support frame) 12 is applied to the perimeter of pleated filter media 10 (comprising filaments 40 bonded to upstream pleat tips thereof) to form framed pleated air filter 1. Pleated filter media 10 being non-self-supporting (even in the presence of filaments 40) as defined earlier herein, frame 12 is required in order for pleated filter media 10 to be properly supported in place in a residential HVAC system. Frame 12 may conveniently take the form of a rectangular frame with four major elongate frame portions that are each mounted on one of the four major edges of the filter media. For convenience in describing such generally rectangular geometry, the four major portions of frame 12 may occasionally be referred to herein by a lettered subscript (e.g., a, b, c, or d). It will be recognized that in a rectangular filter, opposing frame portions (e.g., portions 12*a* and 12*c*; and, portions 12*b* and 12*d*, as shown in FIG. 1) may in some cases be identical to each other. In the case of a square filter, all four portions may in some cases be identical to each other. As pictured in FIG. 1, frame portions 12*b* and 12*d* are portions that are aligned parallel to the pleat direction of pleated media 10; frame portions 12*a* and 12*c* are portions that are aligned orthogonal to the pleat direction. Any two neighboring frame portions of frame 12 meet to form a corner 4 of frame 12. It is emphasized that major frame portions 12*a*, 12*b*, etc., do not necessarily correspond to individual frame pieces from which frame 12 is assembled. In fact, frame 12 might be made from e.g. a single frame piece, or e.g. from two, three, or four frame pieces that are assembled together and connected to each other to form the finished frame 12.

In many embodiments, support frame 12 may be a "pinch" frame as shown in exemplary embodiment in FIGS. 1 and 3. As shown in exemplary embodiment in FIG. 3, a pinch frame is defined by the presence (on at least one major portion of frame 12), of a downstream flange 160 and an upstream flange 130, which flanges comprise at least inward terminal ends that are "pinched" toward each other (so that they are spaced apart from each other a distance that is much less than (e.g., is less than 15% of) the overall thickness of the frame). Such flanges may capture (e.g., pinch) border portion (perimeter edges) 7 of filter media 10 therebetween. A pinch frame is thus distinguished from e.g. a U-shaped (channel) frame that has upstream and downstream flanges that are spaced apart from each other a distance that is very similar to (e.g., is within 20% of) the overall thickness of the frame.

It will be appreciated that some asymmetry will be present in framed filter 1 owing to the pleating of filter media 10. Specifically, with reference to FIGS. 1-3, the upstream and downstream flanges of major frame portions 12*b* and 12*d*, which flanges/portions will be aligned with the pleat direction, may capture a border portion 7 of pleated filter media therebetween, without necessarily having to significantly deform any portion of any pleats (as evidenced by inspection of FIG. 3). In contrast, the upstream and downstream flanges of major frame portions 12*a* and 12*c*, which flanges/portions will be oriented perpendicular to the pleat direction, may deform (i.e., flatten) pleated portions therebetween in the action of being pinched together. This may be of no consequence as long as the pleat portions can be flattened sufficiently to prevent any air leakage between border portion 7 and the various surfaces of the frame sidewalls and flanges. It will be appreciated that in at least some embodiments, compressibility of the pleated filter media 10 (as described later herein) may help ensure that pleats can be sufficiently flattened between the frame flanges that no such leakage pathways exist.

In many cases, most or all of the area of frame flanges 130 and 160 (not just inward terminal ends thereof) may be pinched together; often, most or all portions of flanges 130 and 160 will be at least generally parallel to each other (as shown e.g. in FIG. 3). In any case, at least the inward terminal ends of flanges 130 and 160 will define a pinch plane ($P_i$) as indicated in FIG. 3, meaning the plane in which perimeter edges 7 of filter media 10 are captured by the flanges (often, the perimeter edges of filter media 10 are bonded to one or both flanges, e.g. by adhesive bonding over a wide area or adhesive point-bonding, by stapling, or by any combination of these methods).

In some embodiments each major portion of frame 12 may comprise an outer sidewall 140, which extends outward and downstream from flange 130 and is foldably connected thereto by fold line 135; and, inner sidewall 150, which extends outward and downstream from flange 160 and is foldably connected thereto by fold line 155, with outer sidewall 140 and inner sidewall 150 being foldably connected by fold line 145. (In many embodiments, fold line 145 may provide a terminal downstream end/edge of frame 12.) Thus, in some embodiments a major portion of frame 12 may be conveniently formed by the folding of a suitable precursor material (e.g., paperboard) along fold lines so as to provide flanges 130 and 160 and sidewalls 140 and 150. However, any suitable frame construction may be used; i.e. any major portion of frame 12 may be made of any suitable material (whether paperboard, plastic etc.) and may be formed e.g. by folding of a single frame piece, by the assembling of multiple pieces to each other, and so on. In many embodiments, all four major frame portions may each comprise upstream and downstream flanges and inner and outer sidewalls and foldable connections therebetween.

As used herein, the term foldable signifies that the frame portion is formed (i.e., into the general configuration shown in FIGS. 1 and 3) by folding the various flanges and sidewalls of the frame portion relative to each other along the various fold lines. The term does not denote that the finished frame portion (or the entirety of finished frame 12), once formed, is foldable in the sense that it can be collapsed or folded flat. In fact, in various embodiments frame 12, once formed, is not be collapsible or foldable; thus, the herein-described (optional) nesting of multiple framed filters can be achieved without necessitating (or involving) any significant deformation of the frames of the nested filters.

Details of particular support frames that may be suitable for the uses disclosed herein are provided in U.S. patent application Ser. No. 13/490,545, filed 7 Jun. 2012 and entitled Framed Air Filter with Offset Slot, and Method of Making, which is incorporated herein by reference in its entirety. The finished (framed) filter may be of any suitable size for any desired application.

Each major portion of a frame 12 (e.g., portions 12a-12d as shown in FIG. 1) will comprise a sidewall. In some embodiments, such a sidewall may be comprised of an inner sidewall 150 and an outer sidewall 140 as shown in exemplary embodiment in FIGS. 3 and 4. In some embodiments, inner sidewall 150 and outer sidewall 140 may be positioned at an angle to each other (when viewed in cross section as shown in FIG. 3, and as measured from the vertex provided by fold line 145) of less than about 40, 30, 20, or 10 degrees. In such embodiments, at least portions of inner sidewall 150 and outer sidewall 140 may be generally parallel to each other and may closely approach each other (as shown in FIG. 3). In such embodiments, areas of inner sidewall 150 and outer sidewall 140 may be bonded, e.g. adhesively bonded, to each other, e.g. if desired to enhance the strength of frame 12. In other embodiments, particularly in which an angle of e.g. at least about 20, 40 or more degrees is provided between outer and inner sidewalls 140 and 150, a gap (e.g., in the range of 0.1-2 mm, and which may be filled with e.g. air or at least partially filled with adhesive) may exist between portions of the outer and inner sidewalls. Arrangements of this general type are depicted in exemplary embodiment in FIG. 4.

The sidewalls of major portions of frame 12 can have any suitable angle. As a convenient reference, the angle established by outer sidewall 140 (as seen most easily in FIG. 3) will be used to characterize such a sidewall angle. Specifically, a sidewall angle is the angle between outer sidewall 140 and the major plane of framed filter 1/pleated media 10 (such a sidewall angle can also be considered to be the angle between the outer sidewall and the upstream-downstream axis of the filter, plus 90 degrees). An angle of 90 indicates a "vertical" sidewall that is aligned with upstream-downstream (airflow) direction defined by the overall major plane of the filter (e.g., a sidewall of the angle typically found in conventional U-shaped channel frames). An angle of less than 90 indicates an inwardly-angled sidewall.

In some embodiments, each major portion of frame 12 may comprise a sidewall angle ranging from e.g. about 60 degrees to 100 degrees. In particular embodiments, such a sidewall angle may be about 90 degrees. In some embodiments, each major portion of frame 12 may optionally comprise an outwardly angled outer sidewall to facilitate optional nesting of the framed filters. That is, a sidewall angle of e.g. at least about 100, 110, 120, or 130 degrees, and of at most about 160, 150, or 140 degrees, will facilitate the nesting of framed filters as disclosed herein. (By way of specific example, the sidewall angle of frame portion 12b as shown in FIG. 3, is about 130 degrees). Often, each major portion of frame 12 may comprise a sidewall angle that is generally, or substantially equal, to the sidewall angle of the other major portions of frame 12. However, some asymmetry may be allowed.

Optional Nestability

The disclosures herein allow the optional production of framed filters that are nestable. The term "nestable" denotes framed filters that are configured such that two or more such filters (of like shape, size, and thickness) can be stacked together, without significantly deforming the frames of the filters, at a nesting spacing that is less than 85% of the thickness of each filter. This ratio of nesting spacing to filter thickness (as a percentage) can be referred to as a nesting factor. For purposes of such calculations, the thickness of a framed filter "t" is the distance (as shown in FIG. 3), along the upstream-downstream axis of the filter, from the farthest downstream point of the filter (which in the depiction of FIG. 3, will be provided by the point designed 145), to the farthest upstream point of the filter (which in the depiction of FIG. 3 will be the upstream face of upstream flange 130). (In these and in many cases, the overall thickness of a framed filter may be essentially equal to the overall thickness of the frame.) For purposes of such calculations, for two nested filters the nesting spacing is the distance (along the same axis used for the filter thickness) from a particular reference point on one filter, to the corresponding reference point on the other filter. In various embodiments, framed air filters as disclosed herein may comprise a nesting factor that is less than about 80%, 75%, 70%, 65%, 60%, 55%, 50%, 45%, 40%, or 35%. In further embodiments, framed air filters as disclosed herein may comprise a nesting factor that is at least about 10, 20, or 30%.

Figure 4:
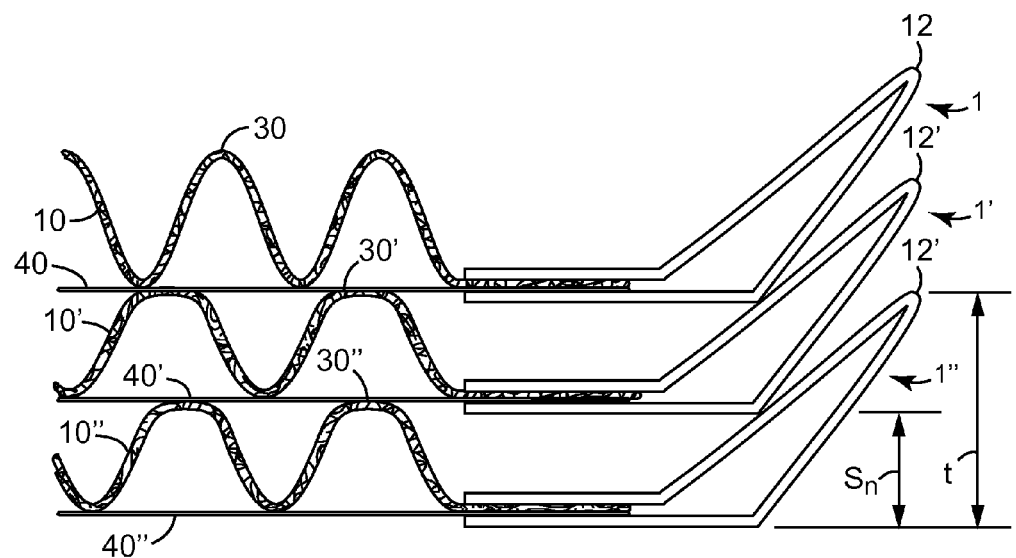
FIG. 4 is a side schematic cross sectional view of portions of a nested stack of exemplary nestable framed pleated air filters.

By way of a representative example, portions of three exemplary nested framed air filters 1, 1' and 1" are shown in FIG. 4 (in cross-sectional slice view). The filter thickness "t" (which is the same for all three filters) is designated, as is the nesting spacing $S_n$ (with the upstream surfaces of the upstream flanges of the lowermost two filters used as (randomly selected) reference points). In FIG. 4, the nesting factor is approximately 55%.

It is noted that for a particular filter design, a nesting factor as defined herein will be a constant that is set by the design. However, it will be appreciated that the amount of space that can be saved in packing the framed filters will increase with the number of filters that are nested together. By way of a specific representative example, nestable framed air filters might each have a thickness of 20 mm and might have a nesting factor of e.g. 70%, so that any two such filters, when nested together, comprise a thickness "overlap" of 6 mm. Thus, instead of two such filters adding to a total thickness of 40 mm, they would add up to a total nested thickness of 34 mm and would provide a space (thickness) savings of (40-34)/40 or 15%. Three such filters would add to a total nested thickness of 48 mm and would provide a space savings of (60-48)/60 or 20%; five such filters would add to a total nested thickness of 76 mm and would provide a space savings of (100-76)/100 or 24%, and so on. It will thus be appreciated that nesting filters as disclosed herein can provide significant savings in packaging, shipping, and storage costs, and it will be further appreciated that the greater the number of filters that are nested together the greater the savings can be.

Further details of nestable filters are disclosed in U.S. patent application Ser. No. 13/968,609, filed evendate herewith, entitled NESTABLE FRAMED PLEATED AIR FILTER AND METHOD OF MAKING, which is incorporated by reference herein in its entirety.

FIGS. 3 and 4 illustrate another feature that may be useful in at least some embodiments. Pleated filter media 10 may comprise a pleating plane $P_p$, which is defined as the plane of symmetry of the pleats, i.e. the plane that is halfway between the upstream and downstream pleat tips, measured along the upstream-downstream direction (as shown in FIG. 3). In at least some embodiments, the presence of filaments 40 will cause the pleating plane $P_p$ of pleated media 10 to be offset downstream from the aforementioned pinch plane $P_i$ established by flanges 130 and 160 of frame 12. That is, filaments 40 may lie largely in a stabilizing plane as mentioned earlier herein, which stabilizing plane may be largely coincident with pinch plane $P_p$, thus causing pleated media 10 to be displaced (offset) downstream from the pinch plane, i.e. toward the open end of the framed filter. Such an offset is evidenced in FIG. 3 by as the distance between planes $P_p$ and $P_i$.

Compressibility of Pleated Filter Media

FIG. 4 illustrates still another feature that may be useful in at least some embodiments. Specifically, in at least some embodiments pleated filter media 10 may be compressible, defined earlier herein as meaning that the pleats of the filter medium can reversibly compress in an upstream-downstream direction e.g. when the framed air filter is nested with other framed air filters of like size and shape, and that the pleats can spring back to their original pleated configuration e.g. when removed from the nested configuration. As illustrated in FIG. 4, such compressibility allows that (if needed) the pleats of at least some of the nested filters (e.g., filters 1' and 1" as depicted in FIG. 4) can temporarily deform (e.g., upon being nested). That is, in the illustrated embodiment of FIG. 4, a downstream portion of downstream pleats 30" of filter media 10" of filter 1", upon being pressed against filaments 40' of filter 1' in the act of nesting these two filters together, can deform so as to allow the nesting to be performed. Downstream pleats 30' of filter 1' can likewise deform when pressed against filaments 40 of filter 1. In various embodiments, sufficient compressibility of the pleated media 10 can provided so that nesting of filters can be achieved even when the nesting spacing is only 90, 80, 70, or 60% of the pleat height (i.e., of the "nominal" pleat height in the absence of any compressive force).

It is noted that even if pleated media 10 is compressible, it may not be necessary that any compression of any or all pleats thereof actually occurs during a nesting process (if nesting is performed), depending on the specific design of the filter (e.g., the filter thickness, pleat height, and so on). It is further noted that although not shown e.g. in FIG. 4, upon nesting of filters together, some slight deformation of filaments 40 (e.g., away from a collectively purely planar configuration) may occur e.g. in addition to any of the above-described compression of pleated filter media 10 that may occur. Also, by definition a compressible pleated filter medium cannot have a reinforcing layer of permanently deformable material (e.g., metal) pleated along therewith and continuously bonded to it. By permanently deformable material is meant a material (such as perforated metal layer, metal wire mesh, expanded metal, etc.) that, upon being pleated, tends to remain in the pleated configuration (and thus to hold the pleated media to which it is bonded in that same configuration so that it is no longer compressible). An example of such a permanently deformable metal layer (an open wire mesh) is described in Example 1 of U.S. Pat. No. 8,162,153 to Fox. This can be contrasted to materials (such as e.g. plastic netting, nonwoven scrims, pre-filter layers and the like) that, even after being pleated (e.g. along with the filter media), do not resist deformation to a sufficient extent to render the pleated media non-compressible.

Absence of Downstream Support

Beyond the requirement that a compressible pleated filter medium cannot have a reinforcing layer of permanently deformable material (e.g., metal) pleated along therewith and continuously bonded to it, a framed pleated filter media as disclosed herein will not comprise any support member on the downstream face of the pleated air filter media. The term support member is used broadly in this context, and signifies any single member, or group of members, that provide downstream support. Such a support member or members include, but are not limited to: one or more strips of paperboard, plastic or metal; any perforated sheetlike layer (such as e.g. a perforated layer of paperboard, plastic, or metal); and any collection of filaments (such as e.g. a wire mesh, a scrim of polymeric materials, a scrim or mesh of inorganic materials such as fiberglass, a netting of polymeric material, a collection of bridging filaments as described herein, an expanded-metal mesh, a woven-wire material, and so on). Any such support member or members are prohibited on the downstream face of pleated media 10, whether or not the member or members are attached to any portion of the downstream face (e.g., the downstream pleat tips), and whether or not the member or members are attached to any portion of the support frame.

In short, the only item(s) of support that are allowed on the downstream face of the framed pleated air filter are the downstream flanges 160 of the frame itself. In fact, any portion that extends (e.g. integrally extends) from a downstream flange 160 of a major portion of frame 12, inwardly to a location that is more than 50% of the distance from the outwardmost edge of that portion of the framed filter toward the geometric center of the framed filter, is considered to be a support member and is not permitted.

The ordinary artisan will appreciate the surprising nature of the herein-presented disclosures that a framed pleated filter can be made, e.g. in sizes as large as e.g. 41×64 cm, that can survive the pressures typically encountered in a residential HVAC system, without downstream support of any kind (excepting the edge support provided by the support frame), without the pleated media having any reinforcing layer of permanently deformable material (e.g., metal) pleated along therewith, and even (in some embodiments) with the pleated media having a sinusoidal pleat pattern rather than being arranged in "zig-zag" style pleats that effectively form triangular trusses that substantially increase the stiffness of the pleated media.

Framed air filters as disclosed herein do not necessarily require pleat registration between the different filters, although this may be optionally done if desired. Thus in at least some embodiments, framed air filters as disclosed herein comprise pleat patterns that are unregistered, meaning that when the various individual framed, pleated filters are manufactured, the placement of the pleats of any one filter media (relative to its frame) is different from the placement of the pleats of at least one other filter media relative to that other filter media's frame. In other words, the pleats of any two framed pleated filters do not necessarily need to line up exactly when the two framed pleated filters are stacked (e.g., nested) together (even though the pleat spacings may often be similar or identical). Such an arrangement is shown in exemplary embodiment in FIG. 4, in which pleated filter media 10 of filter 1 is not registered with pleated filter media 10' of filter 1'. It will be appreciated of course that even when no particular care is taken to manufacture framed filters 1 with registered pleats, occasionally the pleat patterns of some framed filters may be approximately or even closely registered with those of other framed filters, due e.g. to random statistical fluctuations in the manufacturing process. And, in some embodiments, the manufacturing process may be controlled to provide that the pleats of multiple framed pleated filters are all registered with each other.

LIST OF EXEMPLARY EMBODIMENTS

Embodiment 1

A framed pleated air filter, comprising: a non-self-supporting, compressible, pleated air filter media with an upstream face and a downstream face and a generally rectangular perimeter with four major edges, wherein the non-self-supporting, compressible, pleated air filter media comprises a plurality of oppositely-facing pleats with a pleat direction and with a plurality of upstream pleat tips and upstream pleat valleys and downstream pleat tips and downstream pleat valleys, the media further comprising a plurality of bridging filaments that are in discontinuous contact with the upstream face of the media and that are bonded to at least some of the upstream pleat tips; and, a pinch frame comprising four major frame portions, with each major frame portion being mounted on one of the four major edges of the media, wherein the framed pleated air filter does not comprise any support member on the downstream face of the pleated air filter media.

Embodiment 2

The filter of embodiment 1 wherein portions of the bridging filaments are melt-bonded to at least some of the upstream pleat tips.

Embodiment 3

The filter of any of embodiments 1-2 wherein at least some of the bridging filaments are at least generally parallel to each other and are oriented at least generally perpendicular to the pleat direction.

Embodiment 4

The pleated filter of embodiment 3 wherein the bridging filaments comprise a spacing between filaments of from around 3 mm to around 12 mm.

Embodiment 5

The pleated filter of any of embodiments 1-4 wherein the bridging filaments are provided as part of a pre-existing scrim that is adhesively bonded to at least some of the upstream pleat tips.

Embodiment 6

The filter of any of embodiments 1-5 wherein the plurality of oppositely-facing pleats of the media collectively define a pleating plane, wherein upstream and downstream flanges of the four frame portions collectively define a pinch plane, and wherein the pleating plane of the media is offset downstream from the pinch plane.

Embodiment 7

The filter of any of embodiments 1-6 wherein each major frame portion comprises a sidewall angle of from about 100 degrees to about 160 degrees and wherein the framed pleated air filter is nestable.

Embodiment 8

The filter of embodiment 7 wherein the non-self-supporting, compressible, pleated air filter media exhibits a pleat height and wherein the nestable framed pleated air filter exhibits a nesting spacing that is less than about 70% of the pleat height.

Embodiment 9

A kit comprising a plurality of framed pleated air filters of embodiment 7 of like size and shape, wherein the framed pleated air filters are packaged together so as to occupy a total thickness that is less than about 70% of the collective total of the thicknesses of the individual framed pleated air filters.

Embodiment 10

The kit of embodiment 9 wherein the pleated air filter media of at least one of the framed pleated air filters of the kit comprises pleats that are not registered with the pleated air filter media of at least one other of the framed pleated filters of the kit.

Embodiment 11

The filter of any of embodiments 1-8 wherein the non-self-supporting, compressible, pleated air filter media comprises a nonwoven web comprising organic polymeric fibers.

Embodiment 12

The filter of any of embodiments 1-8 and 11 wherein the pleats are sinusoidal pleats in which the upstream pleat tips and the downstream pleat tips exhibit an average radius of curvature of at least about 2 mm and in which none of the upstream pleat tips nor downstream pleat tips are score-pleated.

Embodiment 13

The filter of any of embodiments 1-8 and 11-12 wherein the pleat frequency is from about 0.3 to about 1.2 pleats per cm and wherein the pleat height is from about 4 to about 20 mm.

Embodiment 14

The filter any of embodiments 1-8 and 11-13 wherein the sidewall of each frame portion comprises an outwardly angled inner sidewall and an outwardly angled outer sidewall that meet at a downstream edge of the frame portion, and wherein the inner sidewall and the outer sidewall are positioned at an angle relative to each other, of from about 10 to about 40 degrees.

Embodiment 15

The filter of any of embodiments 1-8 and 11-14 wherein the air filter media comprises an electrostatically charged material.

Embodiment 16

A method of making a framed pleated air filter with an upstream face and a downstream face and a generally rectangular perimeter, the method comprising: providing a non-self-supporting, compressible, pleated air filter media that comprises a plurality of oppositely-facing pleats with a pleat direction and with a plurality of upstream pleat tips and upstream pleat valleys and downstream pleat tips and downstream pleat valleys; bonding a plurality of bridging filaments to at least some of the upstream pleat tips, so that the bonded bridging filaments are in discontinuous contact with the upstream face of the pleated air filter media; and, mounting a pinch frame onto the generally rectangular perimeter of the filter media, wherein the framed pleated air filter does not comprise any support member on the downstream face of the pleated air filter media.

Embodiment 17

The method of embodiment 16 wherein the bridging filaments are extruded as a molten extrudate and are contacted with the upstream pleat tips while still at least semi-molten.

Embodiment 18

The method of embodiment 16 wherein the bridging filaments are provided as part of a pre-existing scrim that is adhesively bonded to at least some of the upstream pleat tips.

EXAMPLES

Numerous Working Examples were made of a variety of designs and configurations. Air filter media were produced or obtained of a variety of compositions, including unpleated media of the general type described in U.S. Pat. No. 8,162,153 to Fox; unpleated media of the general type described in U.S. Patent Application Publication 2008/0038976 to Berrigan; unpleated media obtained from Kimberly Clark (Irving, Tex.) under the trade designation 353H; and, unpleated media (of the general type described in U.S. Patent Application Publication 2004/0011204 to Both) comprising a layer of electrostatically charged fibrillated fibers (30 g/m$^2$) ultrasonically bonded to a 15 g/m$^2$ polymeric netting.

Samples of these media were corrugated (pleated) by being passed through a first nip comprising intermeshing gears of first and second corrugating rolls, in generally similar manner to the methods described e.g. in U.S. Pat. No. 5,256,231. The corrugation (pleating) pattern ranged from a pleat frequency of approximately 1.2 pleats per cm to approximately 0.3 pleats per cm; the pleat height ranged from approximately 3 mm to approximately 19 mm. (The media were not scored before, during or after the process of corrugating.) The resulting pleat patterns were generally sinusoidal.

The pleated media was maintained in contact with the second corrugating roll through a wrap angle to reach a second nip which was between the second corrugating roll and a smooth-faced backing roll. A strand die was provided (of generally similar type to that described in U.S. Pat. No. 7,052,565 to Seth) through which multiple streams of molten extrudate was extruded into the nip between the second corrugating roll and the backing roll, so as to provide bridging filaments that (after the molten extrudate had cooled and solidified) were melt-bonded to the upstream tips of the pleated media. Often, the bridging filaments and the filter media comprised similar compositions (e.g. both comprised polypropylene), to enhance the melt-bonding. The bridging filaments were oriented substantially perpendicular to the pleat direction (e.g., in similar manner to that shown in FIG. 2); typical configurations provided bridging filaments at a spacing of approximately 1 strand per 0.64 cm of filter media width. In representative experiments, the strands were roughly circular in cross section with a diameter of approximately 0.4-0.5 mm.

In this manner numerous samples of non-self-supporting pleated air filter media were produced, bearing bridging filaments (in this case, continuous bridging filaments) on one face thereof. The samples were then framed with pinch frames in generally similar manner to that described in U.S. patent application Ser. No. 13/490,545, with the bridging filaments being present on what would become the upstream face of the finished framed filter. The thus-formed framed filters (many of which were of a nominal size of approximately 36 cm×64 cm×2.5 cm (14 inches×25 inches×1 inch)) typically had a sidewall angle in the range of approximately 130 degrees. Many of these framed filters could be nested (as defined herein) with each other, with compression of the pleats occurring during nesting if necessitated by the pleat height in relation to the nesting spacing (in such cases, the media satisfactorily regained its pleated configuration upon removing the filters from a nested condition). Framed filters were also made of nominal size of approximately 51 cm×64 cm×2.5 cm (20 inches×25 inches×1 inch), which framed filters of this size were also found to be self-supporting.

Air filtration efficiency of various of these framed pleated filters was tested and was found to be generally satisfactory (e.g., similar to various control samples such as the same filtration media which had been e.g. pleated along with a support layer, e.g. wire mesh).

The property of a pleated filter media (in the absence of a support frame) being self-supporting or not could be tested e.g. by placing a piece of the pleated filter media (that is, a pleat pack, without a support frame having been mounted to the edges thereof), of a nominal size of e.g. approximately 36 cm by 64 cm or 41 cm by 64 cm, into an opening of a frame tester e.g. of the general type described in U.S. Patent Application Publication 2012/0317944. Such a frame tester may comprise an opening with flanges that support the perimeter edges of the pleated filter media to an overlap of approximately 1.3 cm (inwardly from the edge of the media) on each perimeter edge. A pressure differential could then be applied to the pleated filter media (with the higher pressure being applied to the upstream face of the filter), which differential may be gradually stepped up to higher values. In such testing, prototypes of non-self-supporting pleated filter media of the general type described herein (i.e., including upstream-side bridging filaments) would typically fail (e.g., would deform/bow in a downstream direction so as to become dislodged from the frame tester opening) at an applied air pressure of no more than 0.05-0.07 kPA (i.e., 0.2-0.3 inches of water). In fact, many of the pleated filter media samples described above could be easily discerned as being non-self-supporting even without performing such a test (e.g., merely by inspection of how limp and floppy the pleated media was, even in the presence of bridging filaments, as would be readily apparent to the ordinary artisan). The framed filters as made were found to be able to satisfactorily withstand the air pressure of a typical residential HVAC system (as discussed herein).

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control.

What is claimed is:

1. A framed pleated air filter, comprising:
a non-self-supporting, compressible, pleated air filter media with an upstream face and a downstream face and a generally rectangular perimeter with four major edges, wherein the non-self-supporting, compressible, pleated air filter media comprises a plurality of oppositely-facing pleats with a pleat direction and with a plurality of upstream pleat tips and upstream pleat valleys and downstream pleat tips and downstream pleat valleys, the media further comprising a plurality of bridging filaments that are in discontinuous contact with the upstream face of the media and that are bonded to at least some of the upstream pleat tips;
and,
a pinch frame comprising four major frame portions, with each major frame portion being mounted on one of the four major edges of the media,
wherein the framed pleated air filter does not comprise any support member on the downstream face of the pleated air filter media, and
wherein each major frame portion comprises a sidewall angle of from about 100 degrees to about 160 degrees and wherein the framed pleated air filter is nestable.

2. The filter of claim 1 wherein portions of the bridging filaments are melt-bonded to at least some of the upstream pleat tips.

3. The filter of claim 1 wherein at least some of the bridging filaments are at least generally parallel to each other and are oriented at least generally perpendicular to the pleat direction.

4. The pleated filter of claim 3 wherein the bridging filaments comprise a spacing between filaments of from around 3 mm to around 12 mm.

5. The pleated filter of claim 1 wherein the bridging filaments are provided as part of a pre-existing scrim that is adhesively bonded to at least some of the upstream pleat tips.

6. The filter of claim 1 wherein the plurality of oppositely-facing pleats of the media collectively define a pleating plane, wherein upstream and downstream flanges of the four frame portions collectively define a pinch plane, and wherein the pleating plane of the media is offset downstream from the pinch plane.

7. The filter of claim 1 wherein the non-self-supporting, compressible, pleated air filter media exhibits a pleat height and wherein the nestable framed pleated air filter exhibits a nesting spacing that is less than about 70% of the pleat height.

8. A kit comprising a plurality of framed pleated air filters of claim 1 of like size and shape, wherein the framed pleated air filters are packaged together so as to occupy a total thickness that is less than about 70% of the collective total of the thicknesses of the individual framed pleated air filters.

9. The kit of claim 8 wherein the pleated air filter media of at least one of the framed pleated air filters of the kit comprises pleats that are not registered with the pleated air filter media of at least one other of the framed pleated filters of the kit.

10. The filter of claim 1 wherein the non-self-supporting, compressible, pleated air filter media comprises a nonwoven web comprising organic polymeric fibers.

11. The filter of claim 1 wherein the pleats are sinusoidal pleats in which the upstream pleat tips and the downstream pleat tips exhibit an average radius of curvature of at least about 2 mm and in which none of the upstream pleat tips nor downstream pleat tips are score-pleated.

12. The filter of claim 1 wherein the pleat frequency is from about 0.3 to about 1.2 pleats per cm and wherein the pleat height is from about 4 to about 20 mm.

13. The filter of claim 1 wherein the sidewall of each frame portion comprises an outwardly angled inner sidewall and an outwardly angled outer sidewall that meet at a downstream edge of the frame portion, and wherein the inner sidewall and the outer sidewall are positioned at an angle relative to each other, of from about 10 to about 40 degrees.

14. The filter of claim 1 wherein the air filter media comprises an electrostatically charged material.

15. A method of making the framed pleated air filter of claim 1 with an upstream face and a downstream face and a generally rectangular perimeter, the method comprising:
providing a non-self-supporting, compressible, pleated air filter media that comprises a plurality of oppositely-facing pleats with a pleat direction and with a plurality of upstream pleat tips and upstream pleat valleys and downstream pleat tips and downstream pleat valleys;
bonding a plurality of bridging filaments to at least some of the upstream pleat tips, so that the bonded bridging filaments are in discontinuous contact with the upstream face of the pleated air filter media;
and,
mounting a pinch frame comprising four major frame portions onto the generally rectangular perimeter of the filter media,
wherein the framed pleated air filter does not comprise any support member on the downstream face of the pleated air filter media, and
wherein each major frame portion comprises a sidewall angle of from about 100 degrees to about 160 degrees and wherein the framed pleated air filter is nestable.

16. The method of claim 15 wherein the bridging filaments are extruded as a molten extrudate and are contacted with the upstream pleat tips while still at least semi-molten.

17. The method of claim 15 wherein the bridging filaments are provided as part of a pre-existing scrim that is adhesively bonded to at least some of the upstream pleat tips.

* * * * *

UNITED STATES PATENT AND TRADEMARK OFFICE
CERTIFICATE OF CORRECTION

PATENT NO.       : 9,174,159 B2
APPLICATION NO.  : 13/968626
DATED            : November 3, 2015
INVENTOR(S)      : Stephen Sanocki Page 1 of 1

It is certified that error appears in the above-identified patent and that said Letters Patent is hereby corrected as shown below:

Specification

<u>Column 12</u>
Lines 56-57, Delete "herewith," and insert -- herewith, under attorney docket number 74411US002 and --, therefor.

Signed and Sealed this
Fifth Day of July, 2016

Michelle K. Lee
*Director of the United States Patent and Trademark Office*